(12) United States Patent
Janitzki

(10) Patent No.: US 6,464,439 B1
(45) Date of Patent: Oct. 15, 2002

(54) LOW TOLERANCE THREADED FASTENER

(76) Inventor: Bernhard M. Janitzki, 14 Oriente No. 3819, Puebla (MX), 72340

(*) Notice: Subject to any disclaimer, the term of this patent is extended or adjusted under 35 U.S.C. 154(b) by 19 days.

(21) Appl. No.: 09/638,454

(22) Filed: Aug. 14, 2000

Related U.S. Application Data

(60) Continuation-in-part of application No. 09/356,128, filed on Jul. 17, 1999, which is a division of application No. 08/906,229, filed on Aug. 4, 1997, now Pat. No. 5,944,465.

(51) Int. Cl.$^7$ .......................... F16B 39/22; F16B 39/30
(52) U.S. Cl. ..................... 411/308; 411/283; 411/310
(58) Field of Search .................... 411/282, 283, 411/284, 308, 309, 310, 311

(56) References Cited

U.S. PATENT DOCUMENTS

| | | | |
|---|---|---|---|
| 1,369,156 A | | 2/1921 | Woodward |
| 2,301,181 A | | 11/1942 | Ilsemann |
| 2,754,871 A | * | 7/1956 | Stoll ..................... 411/283 |
| 2,842,180 A | | 7/1958 | Brown et al. |
| 2,856,617 A | * | 10/1958 | Widmann ............ 411/310 X |
| 3,353,581 A | * | 11/1967 | Evans ..................... 411/311 |
| 3,459,250 A | * | 8/1969 | Tabor ..................... 411/310 |
| 3,517,717 A | | 6/1970 | Orlomoski |
| 3,661,194 A | * | 5/1972 | Macfarlane et al. ..... 411/311 |
| 3,721,283 A | | 3/1973 | Evans |
| 3,850,215 A | | 11/1974 | Orlomoski |
| 3,927,503 A | | 12/1975 | Wilson |
| 4,023,914 A | | 5/1977 | Holmes |
| 4,071,067 A | | 1/1978 | Goldby |
| 4,252,168 A | | 2/1981 | Capuano |
| 4,396,321 A | | 8/1983 | Holmes |
| 4,645,398 A | | 2/1987 | Cosenza et al. |
| 4,846,614 A | | 7/1989 | Steinbock |
| 5,194,214 A | | 3/1993 | Snyder et al. |
| 5,672,037 A | | 9/1997 | Iwata |
| 5,944,465 A | | 8/1999 | Janitzki |

* cited by examiner

Primary Examiner—Neill Wilson
(74) Attorney, Agent, or Firm—Paul M Denk

(57) ABSTRACT

A threaded member such as a bolt, nut, or pipe has a threaded portion on a body of the member. The threaded portion of the member includes a first threaded section, a second threaded section, and a third threaded section. The first and third threaded section have standard threads which comprise standard roots, flanks, and crests. The second section is between the first and third sections and has threads in which a portion of the threads are raised relative to the standard threads to define bumps. The raised sections or bumps comprise a raised root, a raised flank, and a raised crest. The raised root and raised crest define diameters different from the diameters of the standard root and standard crest, respectively. In a exteriorly threaded member, the raised root and crest have diameters greater than the diameter of the standard root and crest, respectively. In interiorly threaded member, the raised root and crest define diameters smaller than the diameters of the standard root and standard crest, respectively.

8 Claims, 8 Drawing Sheets

LOW TOLERANCE THREADED FASTENER

CROSS-REFERENCE TO RELATED APPLICATIONS

This application is a continuation-in-part patent application based upon application having Ser. No. 09/356,128, which was filed on Jul. 17, 1999, which is a division of application having Ser. No. 08/906,229, filed on Aug. 4, 1997, and now U.S. Pat. No. 5,944,465, which issued on Aug. 31, 1999, all being owned by the same inventor.

STATEMENT REGARDING FEDERALLY SPONSORED RESEARCH OR DEVELOPMENT

Not Applicable.

BACKGROUND OF THE INVENTION

This invention relates generally to threaded fasteners such as nuts and bolts and more particularly to threaded fasteners having an improved thread and reduced tolerances and improved fastening.

Threaded fasteners are well known to the art. One goal of threaded fasteners, particularly nut and bolt combinations or threaded pipes, is to provide a fastener that stays tightened and does not loosen in use. Generally accepted matching techniques result in tolerances between the nut an bolt threads and there is clearance or play which allows for movement between the elements. For example, a fastener or nut and bolt can loosen under load or vibration.

Another goal of threaded fasteners is to form seals. Currently, in order to obtain a tight joint or seal for holding gasses and liquids in an application where a lute or sealer would cause contamination or where liquid or gas would attack and destroy the seal, a Dryseal form of pipe thread is used.

Fixed, threaded installations, such as plugs, oil and grease fittings use straight Dryseal (NPSF) for internal and tapered Dryseal (NPTF) for external threads. The hole is tapped straight to facilitate production, especially for multiple tapping, as it is not necessary to stop tapping at a given depth to ensure size.

What occurs, is that there is a fixed position that will be reached as soon as the tapered thread meets the opposing flank. Therefore, there is no possible adjustment axially.

When vibration is a factor in the connection of, for example, two pipes, the Dryseal applies with tapered internal and external threads.

There are several prior art systems that try to remedy the problem of clearance which results in loose connections due to vibration. Locknuts are used with a nylon washer locked in at the end of the nut. When the nylon washer contacts the bolt, it tightens around the thread and locks the nut in position. Locknuts have disadvantages. The nylon portion of nut has no load carrying threads. Further, it requires more material to make the nut longer and the nylon washer and the nut must be made separately and then crimped together. The locknut of this type can be used only a few times, is not as resistant to heat and requires chemicals i.e. nylon.

Deformed nuts have been used to overcome the loosening problem. These comprise nuts that are deformed out of the circular shape and made into rounded-off triangle shape. Then the bolt engages the threads, it contacts three points and the nut locks around the bolt. However, only heat-treated nuts can be used. To make the deliberate deformation requires an expensive manufacturing set-up. Further, the process is very slow. Also, the reaction of each individual nut is variable, which makes it difficult to predict or guarantee tolerances. Moreover, it can only be used with nuts.

A spiral lock is a lock thread is a commercially available alternative. However, the spiral lock provides an interference on the outside diameter of the bolt. It is difficult to control the interference with accuracy. The surface of the bolt thread can cause galling of the nut and subsequent failure.

Interference-fit threads are used which include a complete interference of the matching parts at the flanks to provide an interference or metal flow. However, based upon accepted machining practices, it is very difficult to produce, for example, class 5 threads (Federal Standard Screw-Thread Standards For Federal Services-Class 5 Interference Fit Screw Threads).

Examples of prior art fastener technologies are disclosed in the following U.S. Pat. No. 1,369,156, to Woodward; U.S. Pat. No. 2,842,180, to Brown et al; U.S. Pat. No. 3,459,250 to Tabor; U.S. Pat. No. 3,661,194, MacFarlane et al.; U.S. Pat. No. 3,721,283, to Evans; U.S. Pat. No. 3,850,215, to Orlomoski; U.S. Pat. No. 3,927,503, to Wilson; U.S. Pat. No. 4,023,914, Holmes; U.S. Pat. No. 4,071,067, to Goldby; U.S. Pat. No. 4,396,321, Holmes; U.S. Pat. No. 4,846,614, to Steinbock; and U.S. Pat. No. 5,194,214, to Snyder et al.

However, these prior examples may not form good seals. In my prior patent, U.S. Pat. No. 5,944,465, which is incorporated herein by reference, I disclosed a low tolerance threaded fastener which overcomes many of the above noted problems. The fastener disclosed in the U.S. Pat. No. 5,944,465 patent works well for its intended purpose. However, it can be improved upon, specifically to form a dry seal between two threaded elements.

BRIEF SUMMARY OF THE INVENTION

A threaded member such as a bolt, nut, or pipe has a threaded portion on a body of the member. The threaded portion of the member includes a first threaded section, a second threaded section, and a third threaded section. The first and third threaded section have standard threads which comprise standard roots, flanks, and crests. The second section is between the first and third sections and has threads in which a portion of the threads are raised relative to the standard threads to define bumps. The raised sections or bumps comprise a raised root, a raised flank, and a raised crest. The raised root and raised crest define diameters different from the diameters of the standard root and standard crest, respectively. In an exteriorly threaded member, the raised root and crest have diameters greater than the diameter of the standard root and crest, respectively. In interiorly threaded member, the raised root and crest define diameters smaller than the diameters of the standard root and crest, respectively.

The raised bump or section on the threaded member forms a low tolerance threaded fastener which can be used to form dry seals.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

Figure 1:
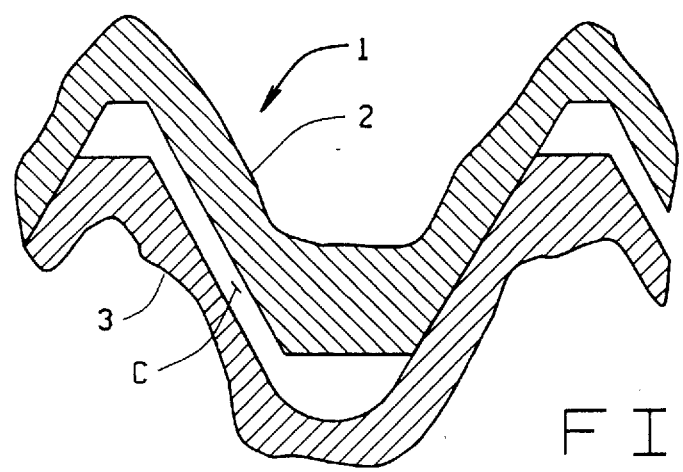
FIG. 1 is a diagrammatic representation of engaged standard prior art threaded fastener threads.
Figure 2:
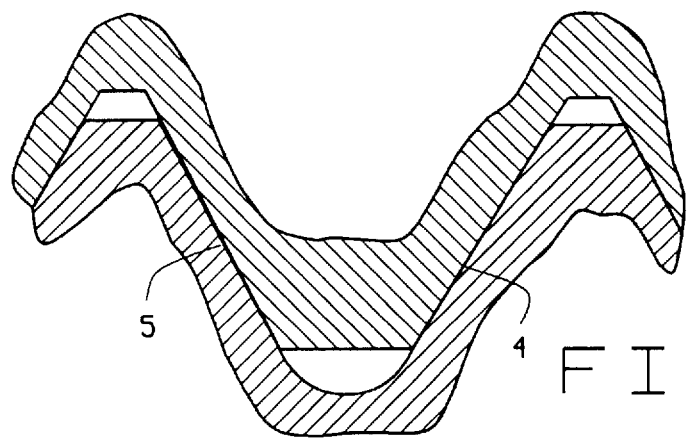
FIG. 2 is a diagrammatic representation of a perfect thread.

FIG. 1 illustrates a standard thread 1 with clearance C. The clearance C defines the amount of play between a normal nut thread 2 and bolt thread 3. As will be appreciated, there are significant clearances C between the respective threads. Under irregular load conditions, the clearance C between the nut and bold threads can significantly increase. The amount of clearance is determined by the tolerances set by the manufacturer. By comparison, an ideal or perfect thread having full flank contact at points 4 and 5 is shown in FIG. 2. A perfect thread, however, would require the nut and bolt have identical pitch diameters without clearance.

Figure 3:
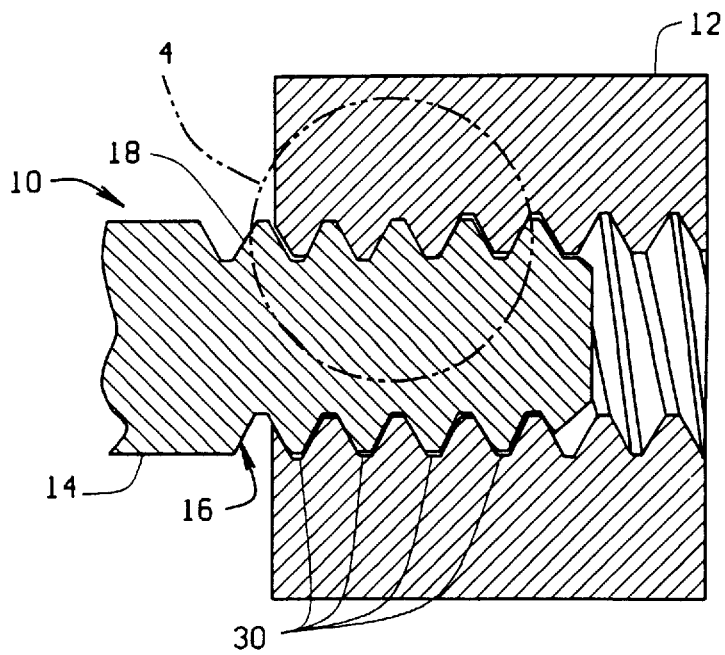
FIG. 3 is a diagrammatic representation of one embodiment of the novel threaded fastener threads of the present invention.

In FIG. 3, a threaded fastener 10 (such as a bolt, screw, or other item having a threaded shaft) of the present invention is shown received in a standard nut 12. As is known, the fastener 10 has a shaft 14 with a portion 16 having threads 18. The threaded portion 16 of the shaft 14 is divided into three portions. There are forward and back portions 20 and 22 which have standard threads. Then, there is a middle portion 24 which has axial bumps 26. Each thread has crest C, a flank F, and a root R. As can be seen from the dotted lines passing through the crests and roots of the threads 20 and 22, the crest and roots of the axial bumps in the middle section 24 are raised as compared to the crests and roots of the threads in the forward and back sections 20 and 22. Preferably, there are three axial bumps 26 spaced about 120° apart on each thread in the middle section 24, and the middle section 24 includes two threads. Between the axial bumps 26, the threads in the middle section 24 form pockets of clearance 28.

In FIG. 3, the threaded connection of the fastener 10 with the nut 12 is shown. As can be seen, the-raised bumps or threads 26 of the fastener 10 interfere with the standard threads of the nut 12 to produce a tight, dry seal between the fastener and the nut. This is shown more clearly in the enlarged view of FIG. 4. However, as seen in FIG. 3, because the bumps 26 are spaced apart, there is clearance at the bottom of the threads, with reference to FIG. 3, as at 30.

Figure 4:
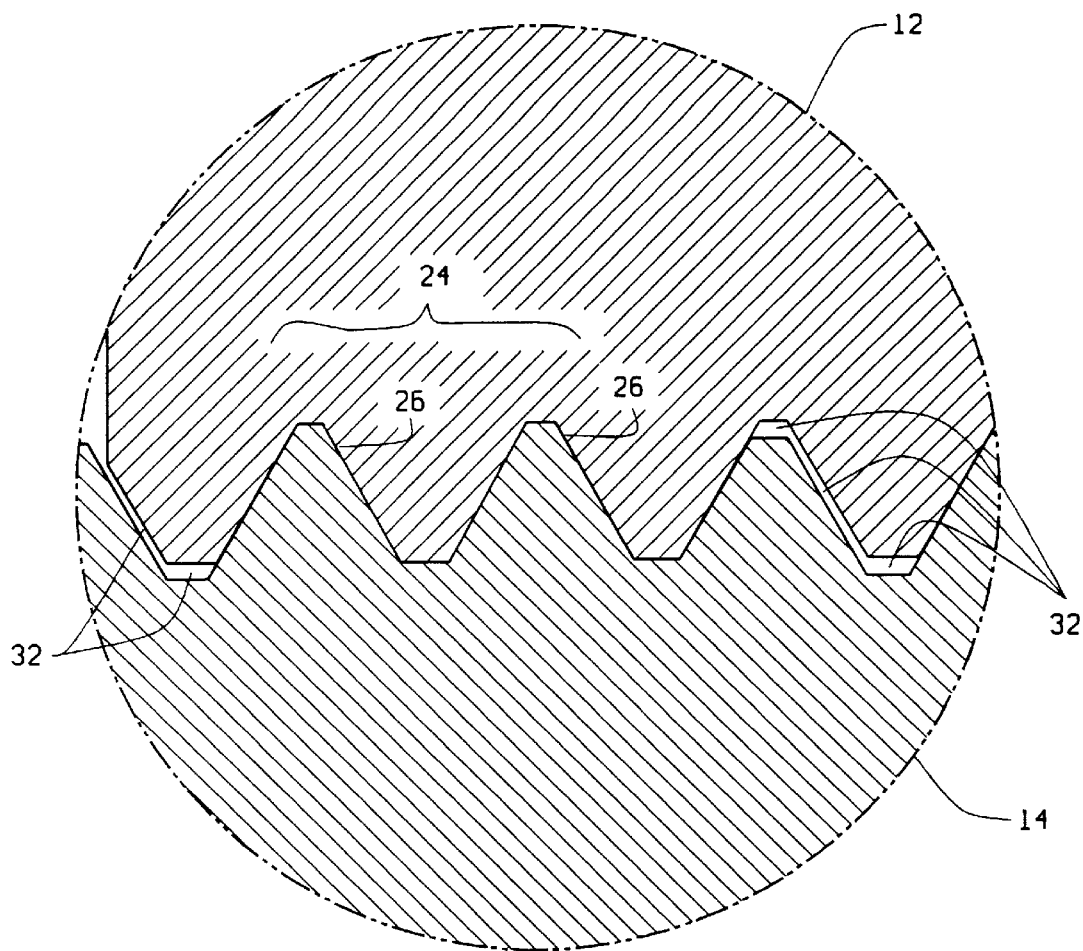
FIG. 4 is an enlarged view taken along the circle 4—4 of FIG. 3.
Figure 5:
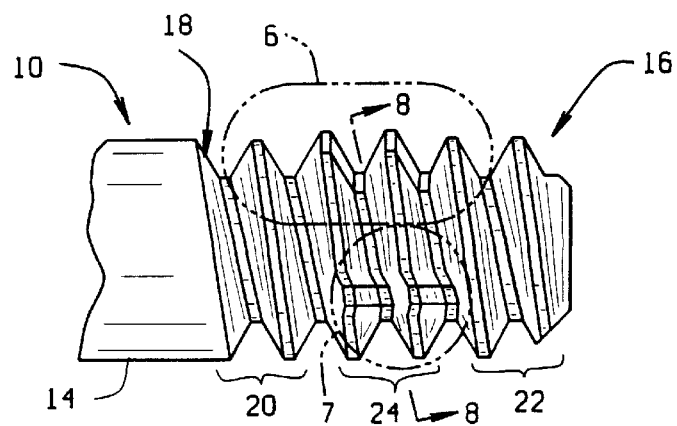
FIG. 5 is a side elevational view of a threaded fastener of the present invention.
Figure 6:
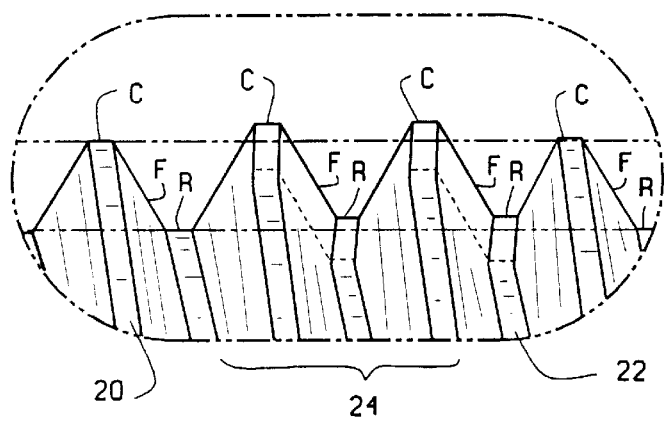
FIG. 6 is an enlarged view of the threads of the fastener taken along line 6—6 of FIG. 5.
Figure 7:
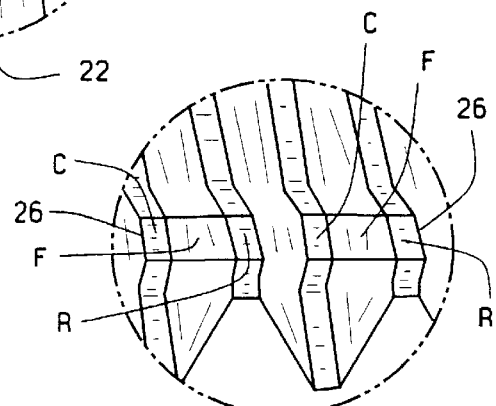
FIG. 7 is an enlarged view of the threads of the fastener taken along line 7—7 of FIG. 5.
Figure 8:
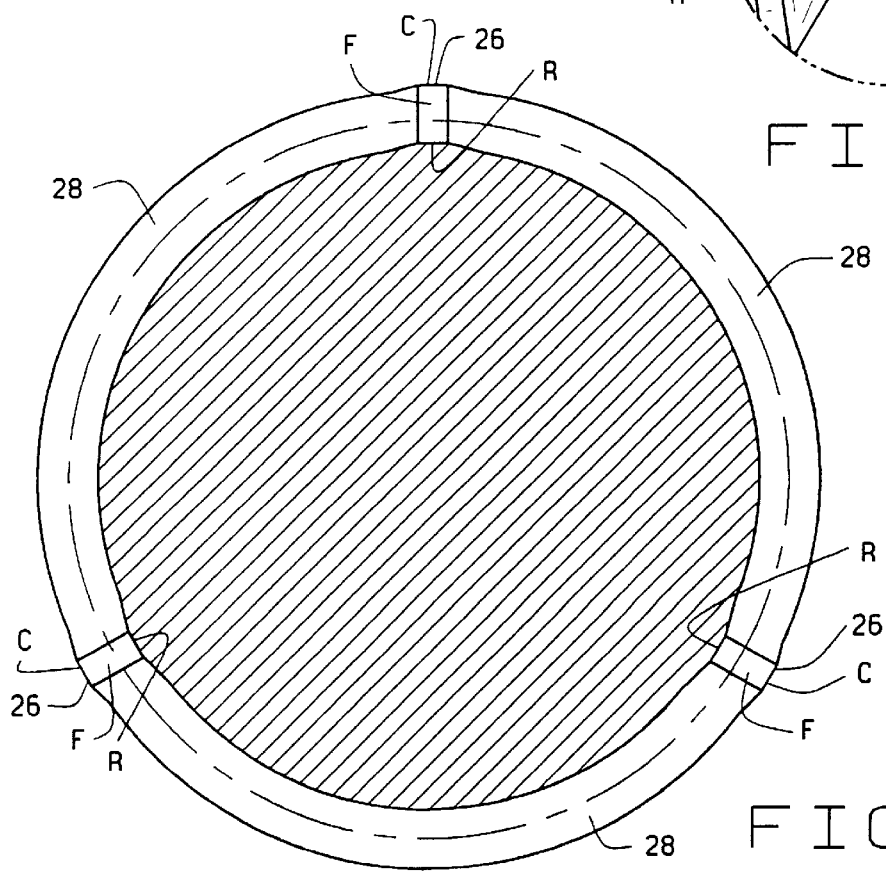
FIG. 8 is a cross-sectional view of the fastener taken along line 8—8 of FIG. 5

Thus, the raised bumps or threads 26 on the two threads form a tight seal between the fastener 10 and the nut 12. What is of great significance is the fact that only a small amount of the radial thread length is needed to seal the flow of liquid or gas through the interconnection between the fastener and the nut. The pockets of clearance 28 between the bumps 26 assure that there will be no contact between the bumps on the left thread flanks, with reference to FIG. 4. For, as can be seen in FIG. 4, on opposite sides of the threads with bumps 26, the sections 20 and 22 retain the clearance 32 of standard cylindrical threads.

Figure 9:
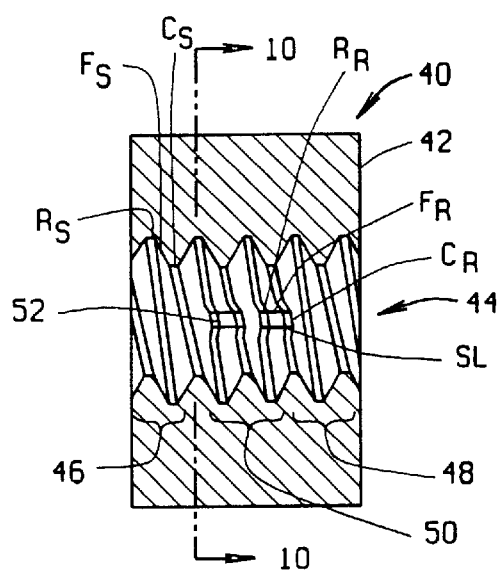
FIG. 9 is a cross sectional view of a bolt incorporating the threads of the present invention.
Figure 10:
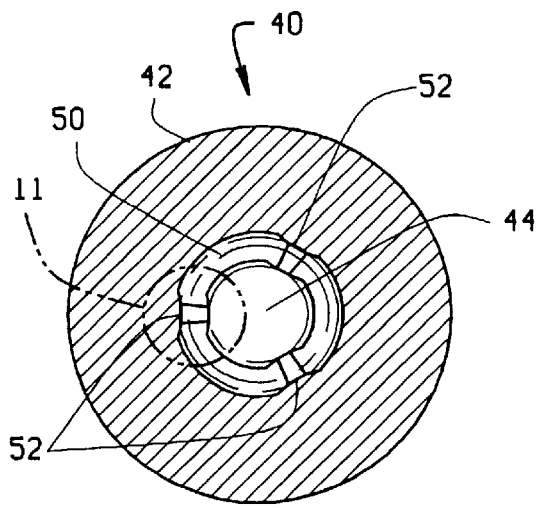
FIG. 10 is a cross-sectional view of the bolt taken along line 10—10 of FIG. 9.
Figure 11:
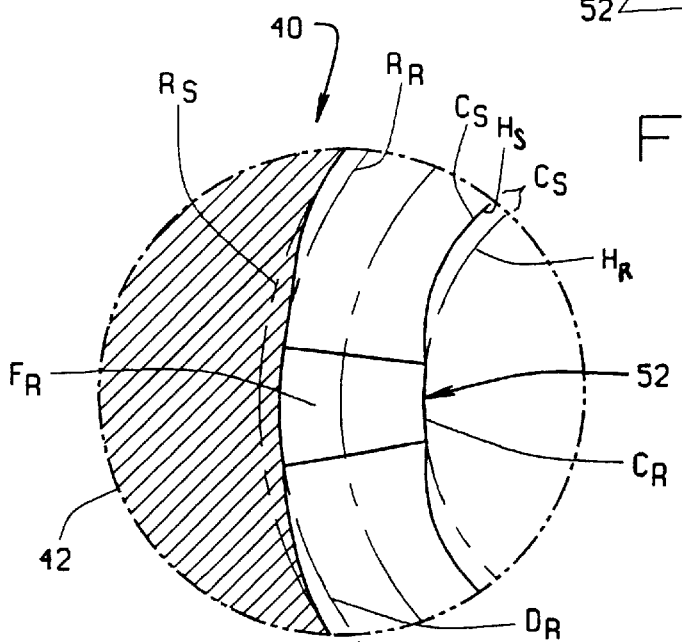
FIG. 11 is an enlarged view of the bolt thread taken along line 11—11 of FIG. 10.

In FIGS. 9–11, a nut 40 incorporating the present invention is shown. The nut 40 includes a body 42 having a passage 44 which is threaded. The passage includes inner and outer sections 46 and 48 which include standard threads, and a central section 50 in which the threads are raised or provided with axial bumps 52. The threads in the inner and outer sections have standard roots $R_s$, flanks $F_s$, and crests $C_s$. The raised threads 52 in the central section 50, on the other head, have raised roots $R_r$, flanks $F_r$, and crests $C_r$. In FIG. 11, the dotted lines from the respective roots and crests show the amount the roots and crests are raised, giving the nut 40 a new diameter $D_r$ and a new tap drill hole diameter $H_r$ smaller than the standard tap drill hole diameter $H_s$.

When a standard screw is received in the nut 40, the raised threads 52 of the nut 40 interfere with the threads of the standard screw in the same fashion that the screw with the raised threads interfered with the threads of a standard nut. Thus, a view of a standard screw received in the nut 40 would appear substantially the same as seen in FIGS. 3 and 4.

The axial bump or raised threads shown on the fastener 10 and nut 40 can also be applied to pipe threads to form a dry seal between a pipe and a bushing or another pipe.

Figure 12:
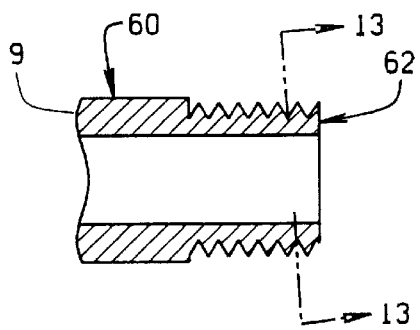
FIG. 12 is an axial cross-sectional view of an exteriorly threaded pipe having the raised threads of the present invention.
Figure 13:
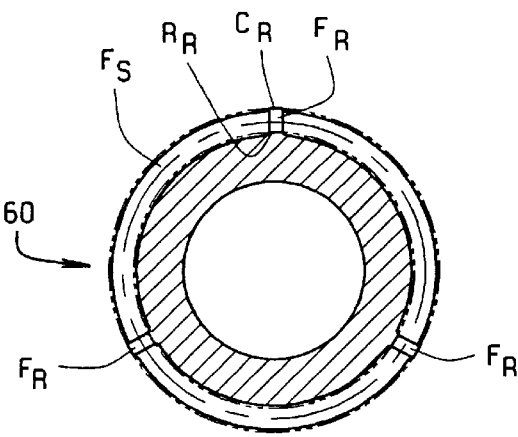
FIG. 13 is a radial cross-sectional view of the pipe taken along line 13—13 of FIG. 12.
Figure 14:
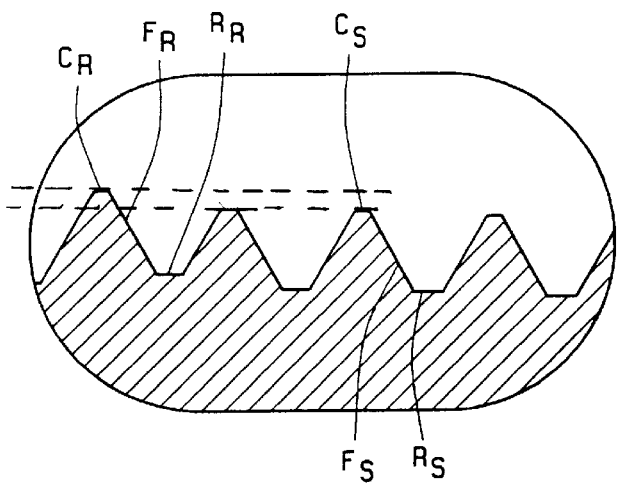
FIG. 14 is an enlarged fragmentary view of the pipe taken on the line 14—14 of FIG. 12.

An exteriorly threaded pipe 60, modified in accordance with the invention is shown in FIGS. 12–14. The pipe 60 has a threaded nose 62. On the threaded end, the crest $C_s$, flank $F_s$, and root $R_s$, are standard thread forms and the crests $C_r$, flank $F_r$ and root $R_r$ are the raised thread forms. The dotted line in FIG. 14 is provided to show the height difference between the raised threads and the standard threads.

Figure 15:
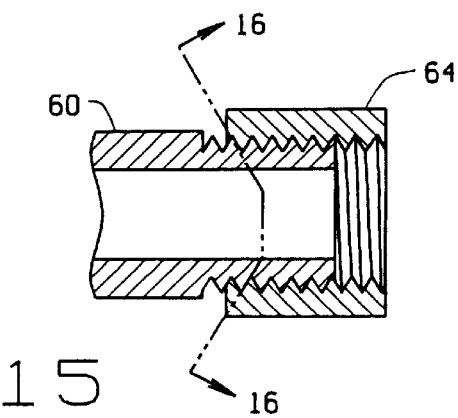
FIG. 15 is an axial cross-sectional view of the pipe of FIG. 12 threaded into a standard bushing.
Figure 16:
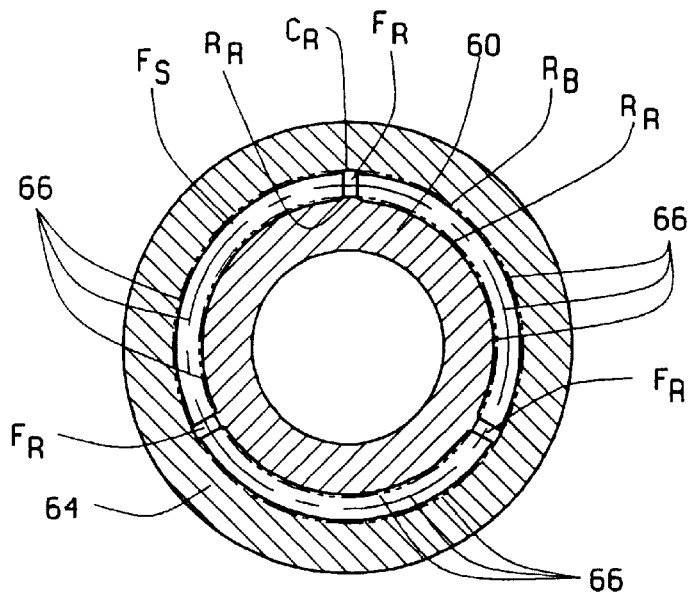
FIG. 16 is a radial cross-sectional view of the connected pipe and bushing taken along line 16—16 of FIG. 15
Figure 17:
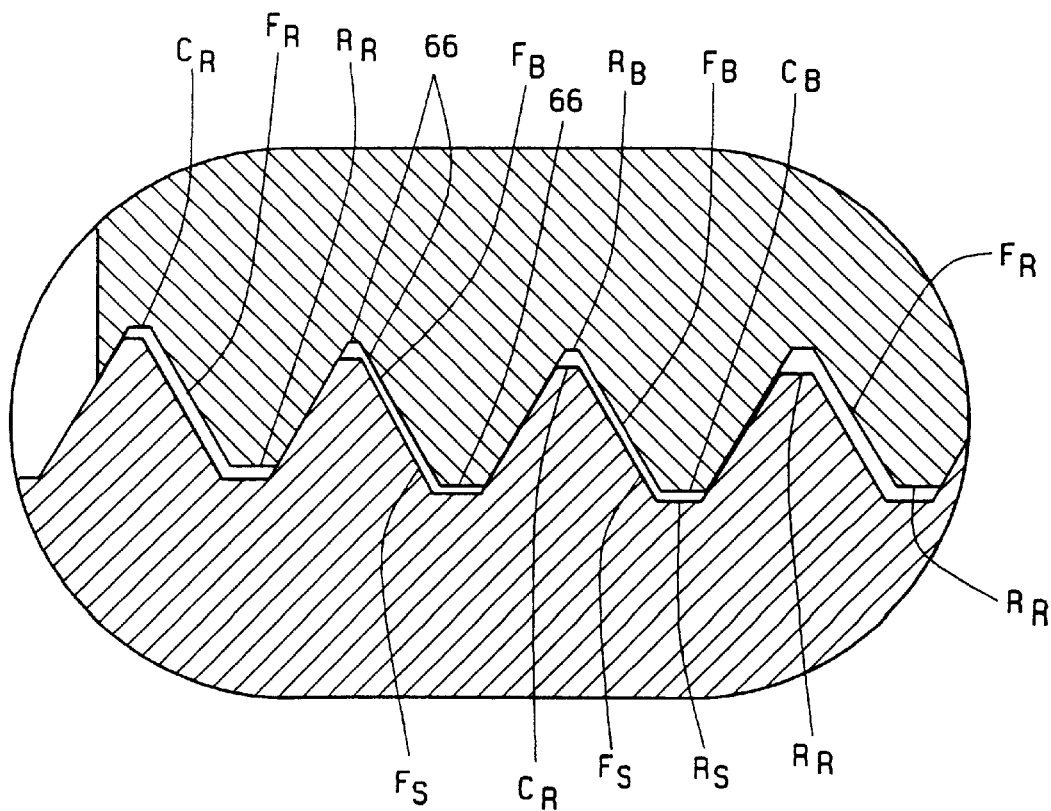
FIG. 17 is an enlarged fragmentary view of the connected pipe and bushing taken along circle 17—17 of FIG. 15.

In FIGS. 15–17, the pipe 60 is shown threaded into a standard NPTF interior pipe bushing 64. The pipe bushing 64 has threads which have flanks $F_b$, roots $R_b$, and crests $C_b$ which are of standard form. The pipe 60 is screwed into the bushing 64 until the raised crests $C_r$ of the pipe 60 crush into the roots $R_b$ of the bushing 64; the bushing roots $R_b$ crush into the raised pipe crests $C_r$, and the pipe's raised flanks $F_r$ meet the busing flanks $F_b$, sealing the threads in two places and eliminating the clearance 66 at the raised threads. The two flanks $F_s$ and $F_b$ do not touch and retain the clearance 66.

The raised crests, flanks, and roots of the pipe 60 are distributed on one thread turn in three places. The raised crests, flanks, and roots can be made radially very narrow. This leaves a great amount of clearance 66 between the sealing threads, as seen in FIG. 16. This great amount of clearance allows for variations on the taper of the pipe (or bushing), and these variations can be overcome by making contact on only two places and the raised thread will crush to adapt to the opposing thread flank.

Figure 18:
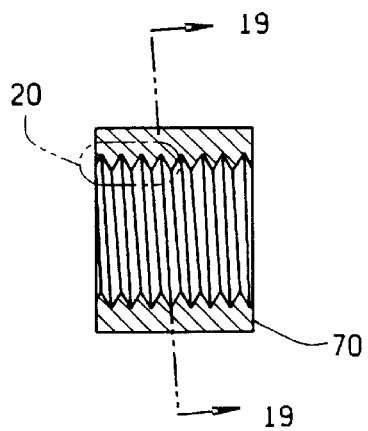
FIG. 18 is an axial cross-sectional view of an interiorly threaded pipe having the raised threads of the present invention.
Figure 19:
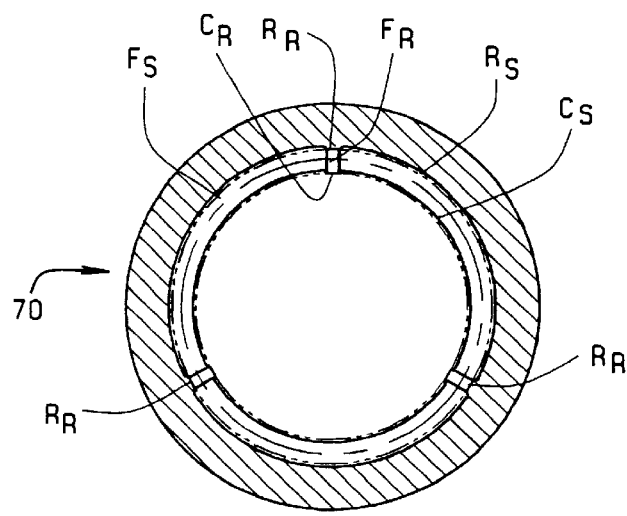
FIG. 19 is a radial cross-sectional view of the pipe taken along line 19—19 of FIG. 18.
Figure 20:
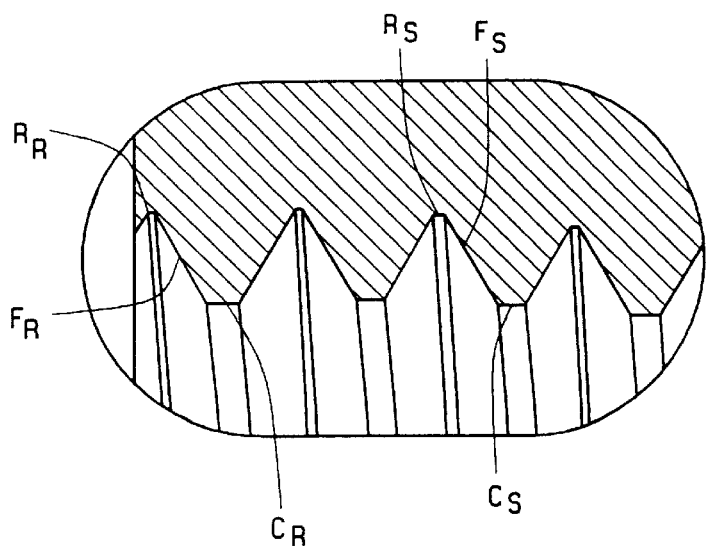
FIG. 20 is an enlarged fragmentary view of the pipe taken on the line 20—20 of FIG. 18.
Figure 21:
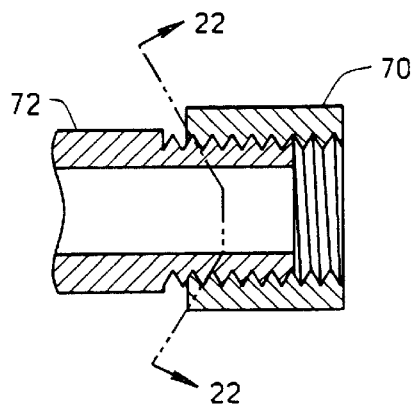
FIG. 21 is an axial cross-sectional view of the pipe of FIG. 18 connected to a standard exteriorly threaded pipe.
Figure 22:
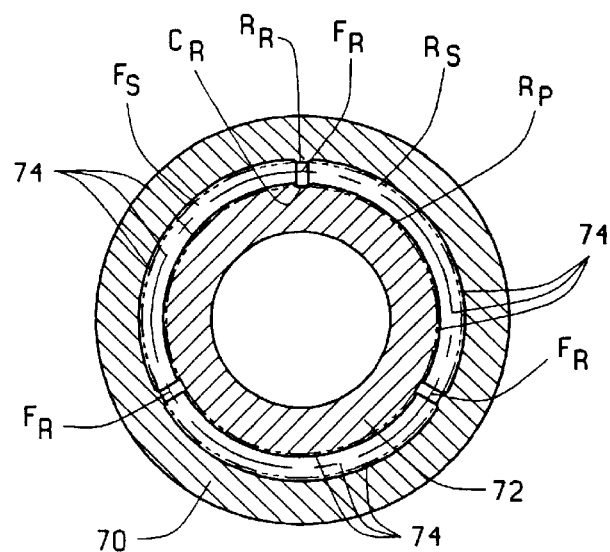
FIG. 22 is a radial cross-sectional view of the connected pipe and bushing taken along line 22—22 of FIG. 21.
Figure 23:
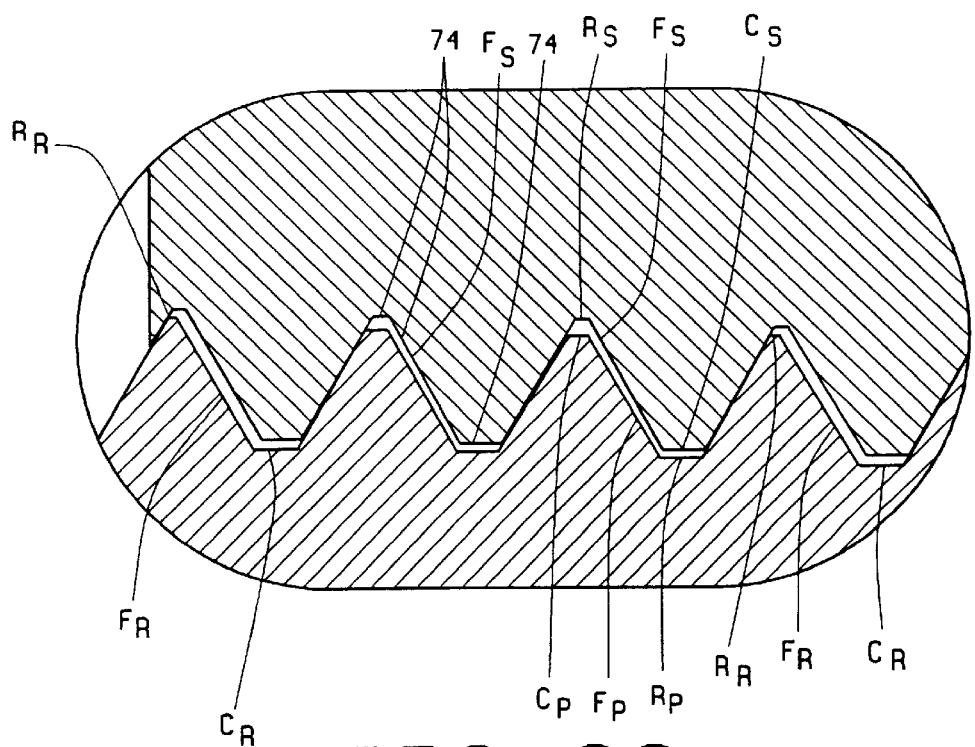
FIG. 23 is an enlarged fragmentary view of the connected pipe and bushing taken along circle 23—23 of FIG. 21.

A bushing or internally threaded pipe 70 is shown in FIGS. 18–20. The pipe threads include threads having standard crests $C_s$, flanks $F_s$, and roots $R_s$ and raised crests $C_r$, flanks $F_r$, and roots $R_r$. The phantom, or dotted line, in FIG. 20 shows the height difference between the standard and raised threads. As with the modified pipe 60, a union between the pipe 70 and a standard NPTF exteriorly threaded pipe 72 is formed by screwing the pipe 70 onto the pipe 72. When this occurs, crests $C_p$ of the pipe 72 crush into the raised roots $R_r$ of the pipe 70; the roots $R_p$ of the pipe 72 crush into the raised crests $C_r$ of the pipe 70, and the flanks $F_p$ of the pipe 72 meet the raised flanks $F_r$ of the pipe 70 sealing the two pipes in two places and eliminating the clearance 74 between the pipe threads at the location of the raised threads, as seen in FIGS. 22 and 23. As with the modified pipe and the standard bushing, the thread flanks $F_r$ and $F_p$ do not touch in the center threads and retain the clearance 74.

The raised threads, formed by the raised crests, raised roots, and raised flanks, of the present invention preserves the low tolerance zero play condition which is obtained by the fastener in my prior patent, U.S. Pat. No. 5,944,465, which is incorporated herein by reference. However, the present invention allows for a controlled number of contact points between two threaded members. The use of the raised threads preserves a lockthread application and adds a Dry-seal feature.

To obtain a dry seal threaded joint currently, one or both of the threaded members must be tapered, and the threads of the two members are jammed together at a fixed distance from the ends of the members. This prior method does not allow for adjustment or variations in tolerance. The raised thread of the present invention, on the other hand, can be turned without loosing the sealing effect. Additionally, as noted above, the raised threads allow for variations in tolerance.

In the oil industry where API (American Petroleum Institute) threads and variations are used extensively, the pipes have to meet a shoulder as well as have the tapered threads. This requires a very high degree of accuracy in forming the threads. Truncation on these threads typically runs from 0.040" to 0.070". When this is multiplied by the large thread diameters and the number of engaged threads, a large interference area is formed, resulting in a substantial amount of friction. Thus, it is difficult to form a tight dry seal with standard API threads. By using the raised threads of the present invention, tapered threads could be replaced with cylindrical threads, which are easier to manufacture.

The raised threads can be made in either metal or plastic fasteners, nuts, pipes, etc.

As is apparent from the foregoing description, the raised threads can be formed on exterior and interior threads.

As various changes could be made in the above constructions without departing from the scope of the invention, it is intended that all matter contained in the above description or shown in the accompanying drawings shall be interpreted as illustrative and not in a limiting sense.

What is claimed is:

1. A threaded member comprising a body and a portion of said body on which threads are formed; said threaded portion of said body having a first threaded section, a second threaded section, and a third threaded section; said first and third threaded section having standard threads, said standard threads comprising roots, flanks, and crests, said roots and crests defining diameters; said second section being between said first and third sections and having threads in which a portion of said threads are raised relative to said standard threads; said raised sections defining bumps having a raised root, a raised flank, and a raised crest, said raised root and raised crest defining a diameter; the raised root and raised crest having diameters different from the standard root and standard crest, respectively, said threaded member being threadedly engageable with a second threaded member, the raised threads of said threaded member being sized in order to sustain a zero tolerance of looseness between the raised threads of the threaded member and the threads of the second threaded member.

2. The threaded member of claim 1 wherein said threads are formed on an exterior surface of said member, said diameters of said raised root and raised crest being greater than the diameters of said standard roots and said standard crests, respectively.

3. The threaded member of claim 1 wherein said threads are formed on an interior surface of said member, said diameters of said raised root and raised crest being smaller than the diameters of said standard roots and said standard crests, respectively.

4. The threaded member of claim 1 wherein said raised sections are formed on fewer than three thread turns.

5. The threaded member of claim 1 wherein said second section includes three raised bumps on each thread turn in said second section.

6. The threaded member of claim 5 wherein said raised bumps are spaced apart by about 120°.

7. The threaded member of claim 1 wherein each raised section providing a bump extends perpendicularly with respect to the thread.

8. The threaded member of claim 1 wherein the raised section defining the bumps extend diametrically of the threaded member, across the flank of the threads.

* * * * *